United States Patent Office 3,432,990
Patented Mar. 18, 1969

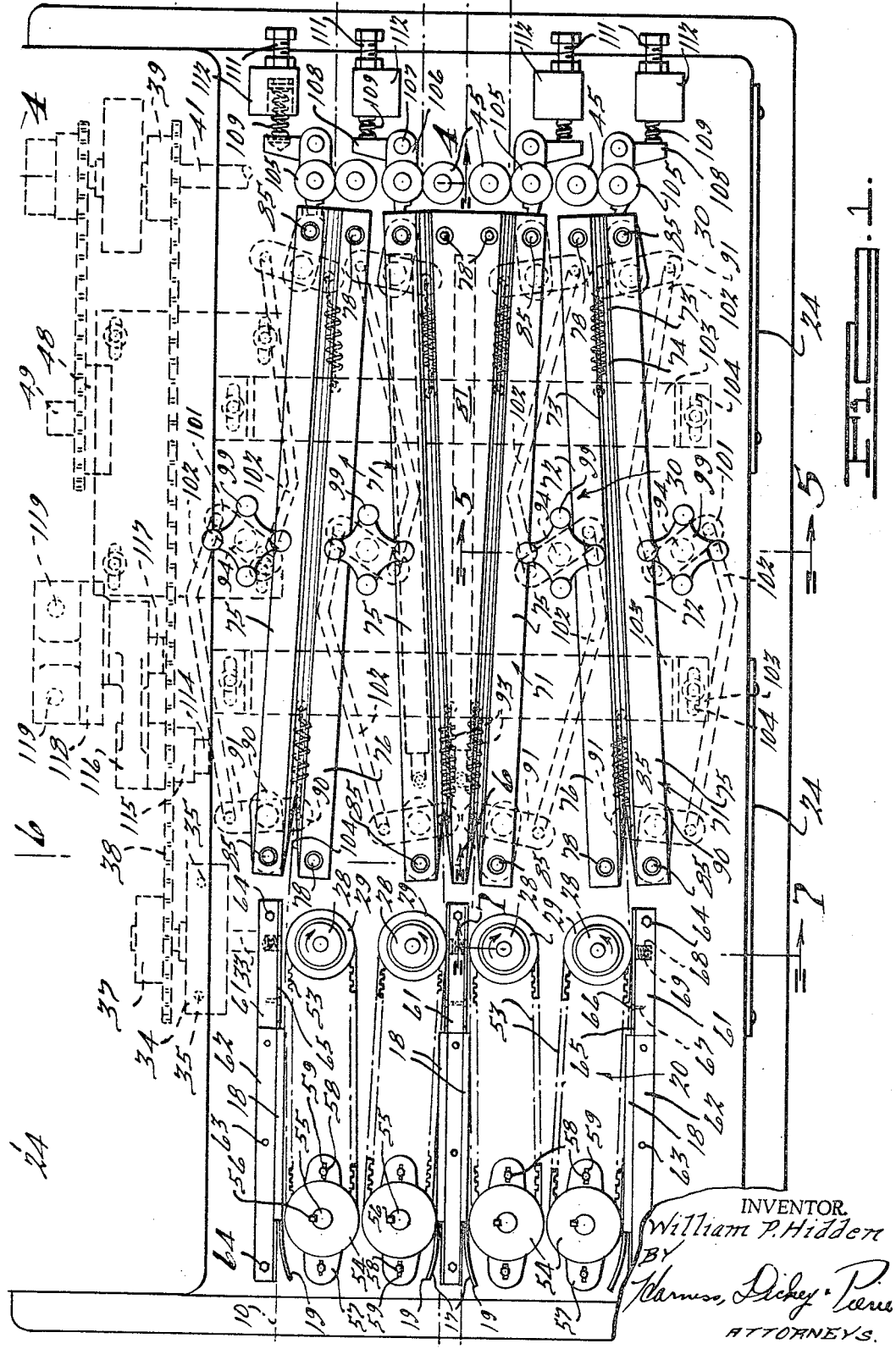

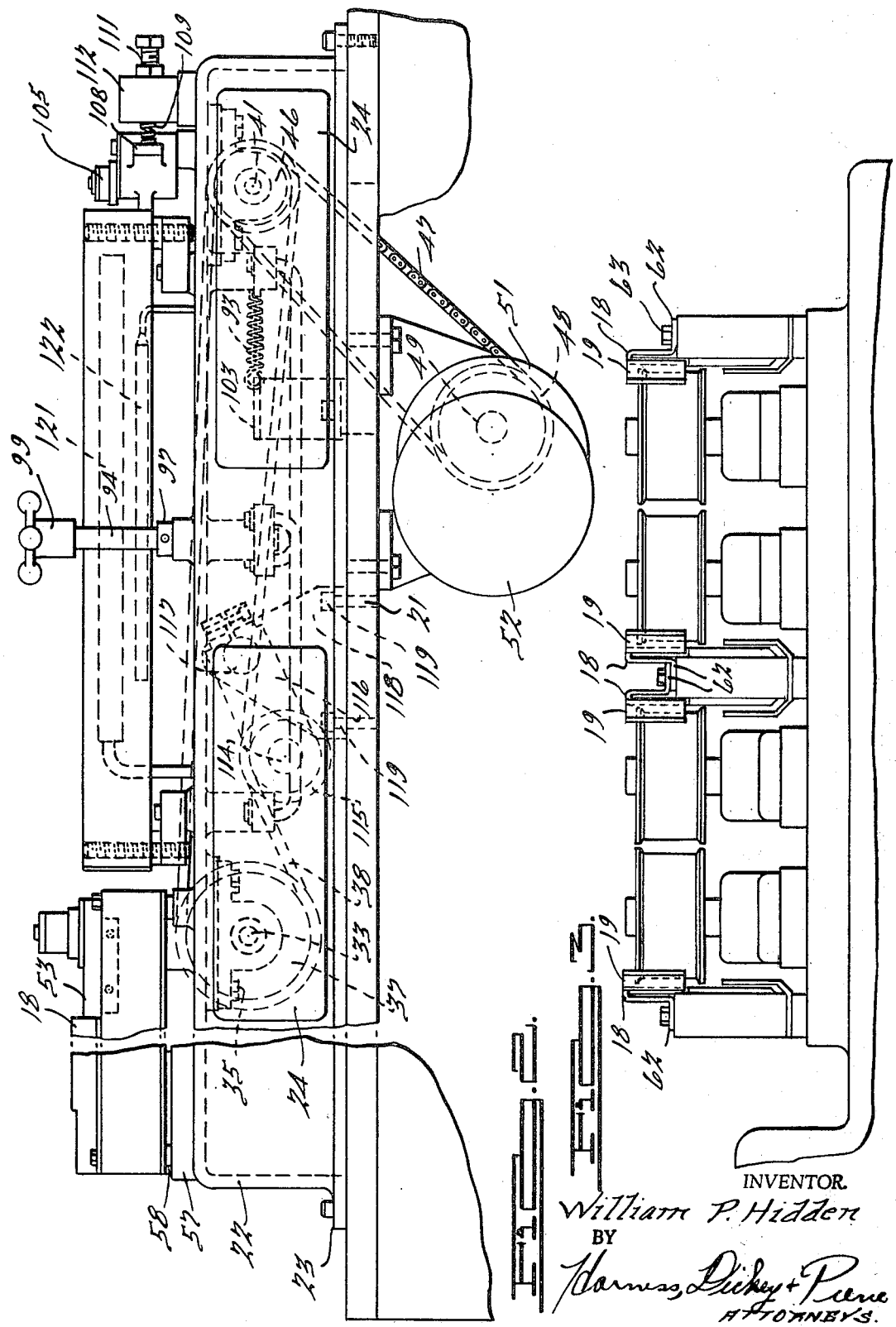

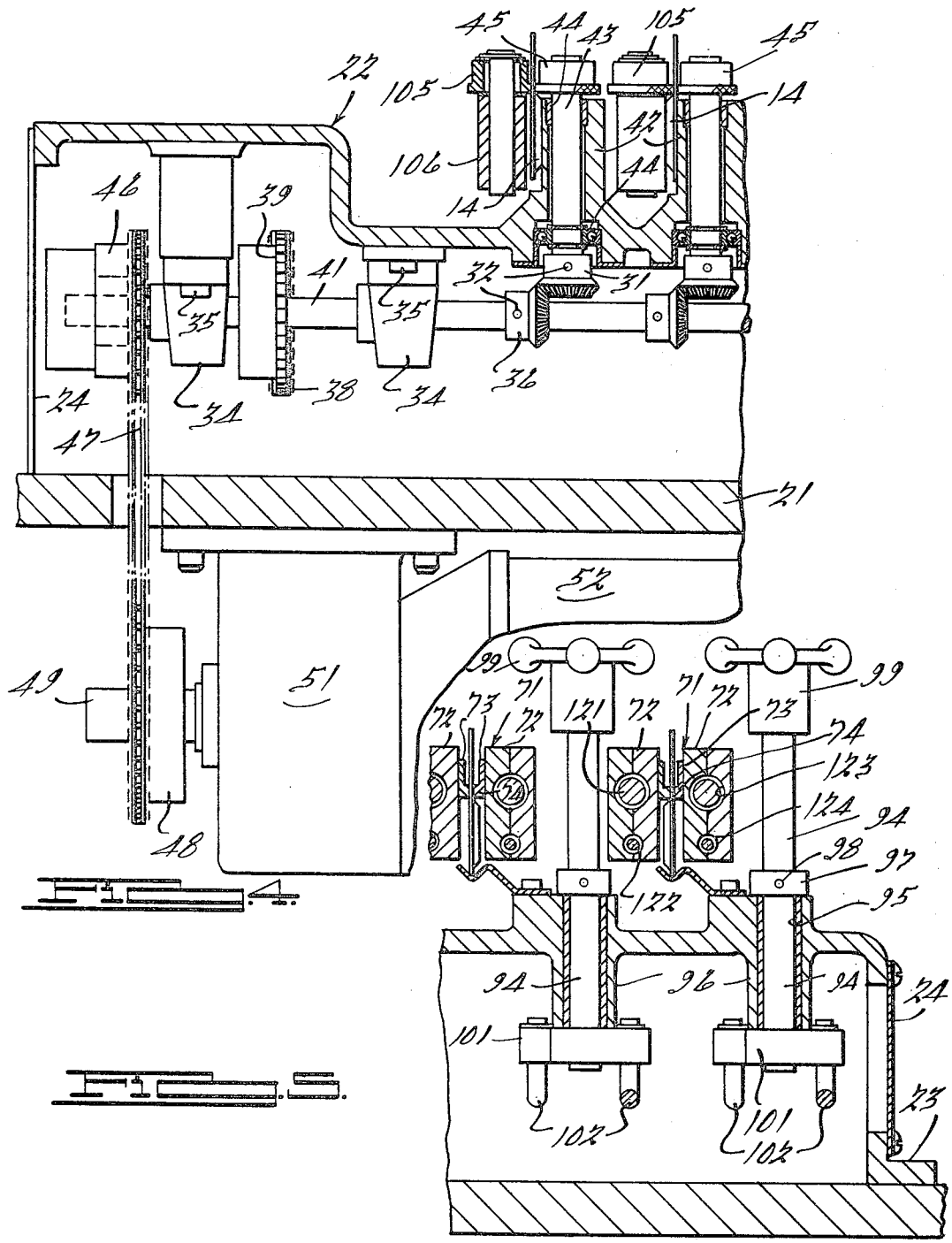

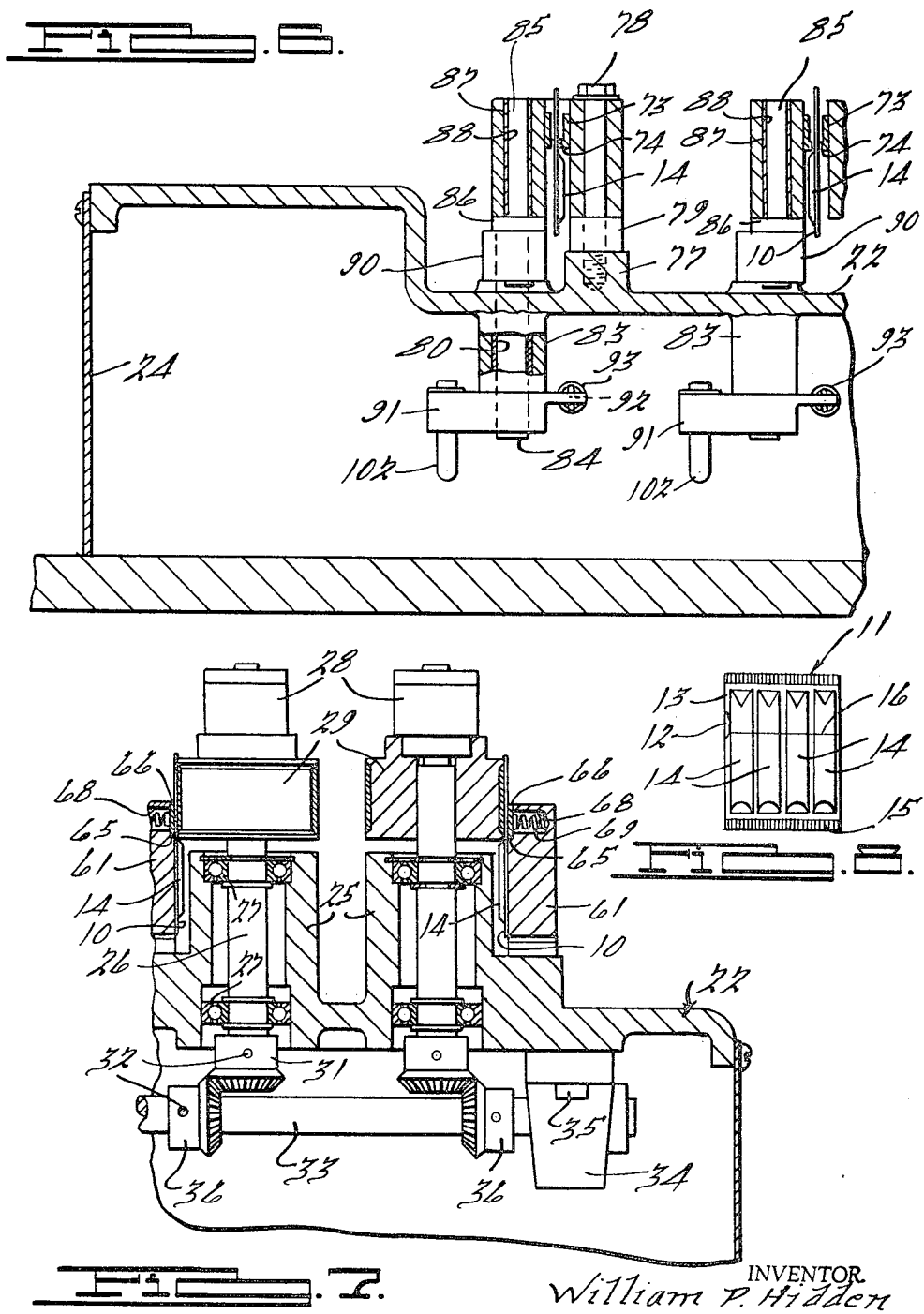

3,432,990
FLUTED PACKAGE SEALING APPARATUS
William P. Hidden, Wenham, Mass., assignor, by mesne assignments, to Diamond Crystal Salt Company, St. Clair, Mich., a corporation of Michigan
Filed Oct. 20, 1965, Ser. No. 498,683
U.S. Cl. 53—373                      18 Claims
Int. Cl. B65b 7/06, 51/14

ABSTRACT OF THE DISCLOSURE

This invention relates to an improved sealing device for one or more strips containing a plurality of filled pockets which has the open end folded and sealed during the passage through the device.

---

In a copending application of I. D. Boynton et al., Ser. No. 498,663, filed Oct. 20, 1965, for Apparatus for Making Fluted Packages, and assigned to the assignee of the present invention, apparatus is illustrated and claimed for handling sheet material to form pockets therein which are filled with a material such as a condiment or the like. The present apparatus is so constructed as to operate simultaneously on a plurality of strips, herein illustrated as four in number, containing the pockets of fill material which are passed through the closing and sealing devices thereof. In the device, the open ends of the filled pockets of the four strips are folded and sealed and individual packages are cut from the strips and packed for shipment. Each of the four strips are advanced between a wall and a belt where the ends are folded and thereafter through a pair of heat irons one of which is movable toward and away from the other to aid in initially locating the strips containing the filled packages therebetween. The strips are advanced between pairs of rollers, one of which is driven to draw the strips through each pair of heat sealing irons. The movable irons are moved into engaged relation with the edge of the strip with a predetermined spring pressure. The sealing irons are heated to a controlled degree of temperature so that as the material of the front sheet is folded at the open end of the pockets it is heat sealed to the back sheet of the strips to close the pockets. The driving rollers continue to advance the strips to a cutoff device which severs individual packages from the ends of the strips.

Accordingly, the main objects of the invention are: to provide a folding and heat sealing device for the open ends of filled pockets on one or a plurality of strips with a belt which progressively folds the open ends of the pockets against the back sheet of the strips in a direction normal to the strips; to provide driven rollers for advancing the strips through the folding device and between a pair of heating irons which heat seals the folded ends during the passage of the strips therebetween; to provide a plurality of folding devices for the ends of pockets of a plurality of strips which are advanced therefrom and drawn through a pair of sealing irons by rollers located at the ends of the irons; to provide a pair of heating irons aligned with each folding device for the open ends of the package, one of which is movable toward and from the other and urged thereagainst by the pressure of a spring, and in general, to provide a forming and sealing device for the open ends of filled pockets on a plurality of strips, which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a plan view of a folding, sealing and advancing device for four strips having filled pockets thereon which are open at the top;

FIG. 2 is a broken side view of the structure illustrated in FIG. 1;

FIG. 3 is an end view of the structure illustrated in FIG. 1, as viewed from the left hand end thereof;

FIG. 4 is an enlarged broken sectional view of the structure illustrated in FIG. 1, taken on the line 4—4 thereof;

FIG. 5 is an enlarged broken sectional view of the structure illustrated in FIG. 1, taken on the line 5—5 thereof;

FIG. 6 is an enlarged broken sectional view of the structure illustrated in FIG. 1, taken on the line 6—6 thereof;

FIG. 7 is an enlarged broken sectional view of the structure illustrated in FIG. 1, taken on the line 7—7 thereof, and FIG. 8 is a view in elevation of a filled package.

A package 11 which had one end folded and sealed by the structure and method of the present invention, is illustrated in FIG. 8. The package is severed from one or a plurality of strips 10 having a back strip 12 and a front strip 13 of paper or like material having adjacent faces which are heat sealable. The front strip 13 was corrugated in the apparatus illustrated, described and claimed, in the above set forth copending application. The corrugations in the front strip 13 form pockets 14 when the bottom edge 15 is crimped and heat sealed, leaving the pockets open at the top. The pockets are filled with a condiment such as salt, pepper, sugar, and the like, to a predetermined degree, after which the top edge is advanced through a pocket closing device 20 and a heat sealing device 30 where the top ends are folded and sealed. Thereafter, the strips are advanced into a flap folding device (not shown) when flaps are employed, and a cutting device (not shown) where the flap is folded and the packages are severed from the strips to produce the individual package 11, as illustrated in FIG. 8. The front strip 13, corrugated to form the pockets 14, may have a score 16 extended across the face of the pockets which tear to open and expose the material when the back strip 12 is bent rearwardly at the score line. This permits the material carried by the pockets, to be poured therefrom.

The four strips 10 are advanced from the device of the above mentioned copending application with the pockets open at the top and filled with condiment material. The strips are supported within flanges 17 and when the upper end of the back strip 12 is extended to form a flap, it projects within inverted channel guide elements 18. One of the flanges 17 at the forward end is curved outwardly at 19 to form a wide opening for receiving the upper flap ends of the strips when initially fed into the closing device 20. The closing device 20 and the heat sealing device 30 are built on a table 21 on which a hollow casting 22 is supported on flanges 23. Access openings are provided in the side wall of the casting covered by removable closure plates 24.

The top face of the casting has bosses 25 extending upwardly therefrom, in which stub shafts 26 are supported on bearings 27. The shafts 26 drive through an overrunning clutch 28 to drive a belt pulley 29. The lower ends of the shaft 26 have a bevel gear 31 secured thereto by a pin 32. A shaft 33 is mounted on bearings 34 secured to the undersurface of the casting 22 by screws 35. The shaft 33 has bevel gears 36 secured thereon by pins 32 with the teeth thereof in engagement with the teeth of the bevel gears 31 so that the pulleys 29 are driven through the clutches 28 from the shaft 33. A sprocket wheel 37 on the end of a shaft 33 is driven by a chain 38 from a sprocket wheel 39 on a shaft 41. The shaft 41 is similar to the shaft 33 and is supported on like bearings 34 from the underside of the casting 22 by screws 35.

The top face of the casting 22 is provided with bosses 42 for supporting stub shafts 43 in bearings 44 for rotation by a similar set of bevel gears 31 and 36 secured to the shaft 41 and the stub shafts 43 by the pins 32. Each of the stub shafts 43 carries a knurling or corrugating roller 45 which is positively driven thereby. The extending end of the shaft 41 has a sprocket wheel 46 secured thereto driven by a chain 47 from a sprocket wheel 48 on a shaft 49 from a gear reduction element 51 on a motor 52 suspended from the underside of the table 21. The sprocket wheels 37 and 39 are of such diameter that the shafts 33 and 34 are run at such a rate of speed that the driving of the belt pulleys 29 advances the belts 53 at a rate substantially conforming to the peripheral speed of the corrugating rollers 45. If the rollers 45 advance the strip a slightly greater rate than the travel of the belts 53, the clutches 28 will permit the overriding of the belt relative to the advancing strips. The belts 53 are mounted over the pulleys 29 and pulleys 54 which are fixed on stub shafts 55 by keys 56. The stub shafts 55 are mounted in bearings in a hub (not shown) having a base plate 57 which is secured by screws 58 in slots 59 to the top face of the casting 22 for adjustment thereon to properly tension the belts 53.

It will be noted from FIG. 7 that adjacent pairs of the gears 36 face each other so that the shafts 26 driven thereby will rotate in opposite directions to have the portions of each belt contacting the strips 10 advance forwardly therewith. As illustrated in FIG. 1 three parallel bars 61 are mounted in spaced relation on the top of the casting 21 to which the flange 62 of the guide elements 18 are secured by screws 63. The ends of the bars and the forward end of the flange 62 are secured in position by by screws 64. The side faces at the ends of the bars adjacent to the pulleys 29 are recessed at 65 to receive a pressure plate 66 which is loosely secured in position by a screw 67 over an aperture 68 containing a spring 69. Since the belts are angularly disposed relative to the plates, they will progressively engage the top ends of the pockets 14 and fold them against the back strip 12 and against pressure plates 66 which are biased outwardly toward the belts by the spring 69 with a predetermined tension. In this manner the folding of the top of each of the packages 24 occurs in a direction normal to the strips so that neat folds are made when closing the top of the pockets.

Aligned with each of the four channels 18 are four pairs of sealing irons 71, each iron consisting of a pair of heating bars 72 having L-shaped sealing element 73 secured on adjacent faces with the bottom flanges 74 disposed in abutting aligned relationship. It is to be understood that flange 74 may be machined on the sides of the heating elements instead of being supported thereon by the vertical flange of the L-shaped angle element 73. A fixed sealing iron 76 of the outer pairs 71 is supported on a boss 77 on the top of a casting 22 by screws 78 which extends through a bushing 79. A centrally located angular sealing iron 81 of the inner pair 71 is secured in a similar manner to bosses 77 by screws 78. The fixed sealing irons 81 and 76 have movable sealing irons 75 associated therewith to form the four pairs of sealing irons 71. Bosses 83 on the underside of the casting 22 support stub shafts 84 in sleeve bearings 80. The end of the shafts 84 above the casting 22, has an arm 90 fixed thereto with a pin 85 extending upwardly at the forward end on which a washer 86 is disposed. A bearing sleeve 87 is mounted in an aperture 88 at each end of the movable heating elements 75 which receive the pins 85. A bar 91 is fixed to the lower end of the stub shafts 88 one of which has an aperture 92 for receiving the end of a spring 93.

Stub shafts 94 are mounted in sleeve bearings 95 in bosses 96 on the underside of the casting 22, as illustrated in FIG. 5. The stub shafts 94 are supported against downward movement by a washer 97 secured thereto by a pin 98. An operating handle 99 is secured to the upper end of the stub shafts 94 and a cross bar 101 is secured to the lower end thereof. Angle-shaped rods 102 are secured to the end of the bars 91 and to both ends of the cross bar 101, as clearly illustrated in FIGURES 1, 5 and 6. The springs 93 on the bars 91 rotate the shaft 84, the arm 90 and pin 85 to urge the sealing iron 75 into engagement with the stationary irons. A pair of stirrups 103 are secured to the table 71 by flanges on the downwardly extending end sections for supporting the other end of the springs 93. The flanges have a slot 104 therein by which the stirrups are adjusted to strengthen or weaken the springs. The springs apply a predetermined pressure for maintaining the flanges 74 of the movable sealing irons 75 of the pairs in engagement with each other.

When the operating handles 99 are rotated to separate the irons, the bars 91 are swung in a direction to stretch the springs 93 and move the movable sealing irons 75 away from the fixed sealing irons until the rods 102 engage each other and lock the bars 91 against turning. This permits the initial feeding of the four strips into the sealing device 30, aided by the diverging ends 104 of the flanges 74 located adjacent to the belts 53. After the strips have been inserted in position, the reverse rotation of handles 99 unlock the bars 91 and permit the springs 93 to advance the movable sealing irons 75 to clamp the folded edges of the pockets 14 of the strips 10 between the flanges 74 of the pairs of sealing irons 71.

A roller 105 is supported on a pin secured to one arm of a bellcrank 106 mounted on a pivot pin 107. The other arm 108 of the bellcrank is engaged by a compression spring 109, the tension of which may be changed by a screw 111 mounted on a boss 112 having an aperture which receives the spring. The rollers 105 are urged toward the rollers 45 with a predetermined pressure and as the heat sealed edge of the strips are advanced therethrough by the driving of the rollers 45, the knurling or corrugation on one or both of the rollers 45 and 105, extend into the material of the strips and increases the holding force of the seal and the appearance of the sealed edge. The strips are pulled through the forming and sealing devices 20 and 30 by the driven rollers 45. The driven belts 53 press the upper ends of the pockets 14 against the back strips 12 by a force applied normal thereto to produce neat folds.

An idler sprocket 115 engages the underside of a chain 38 to take up any slack therein. The sprocket 115 is mounted on a shaft 114 on an arm 116 which is adjustable on a pin 117 fixed to an upright 118 and attached to the table 21 by screws 119. Heating elements 121 and 122 are mounted in apertures 123 and 124 in the heating bars 72. Controls are provided for regulating the amount of heat supplied to the flanges 74 which produces the sealing of the folded ends of the pockets 14 to the backing strip 12. After passing from the sealing device 30, the strips are advanced into a cutting device (not shown) where individual packages 11 are severed therefrom and collected and packed for shipment. When the flap extension is provided on the back strip 12, the strips pass into a folding device (not shown) where the flap is folded back against the back face of the strip 12 and sealed thereto when passing over the heat sealing elements of the device. Thereafter, the strips are severed to separate the individual packages which are then collected and automatically packed for shipment.

What is claimed is:
1. In a device for closing the tops of pockets filled with a material and extending outwardly from the face of a continuous back strip, a pair of pulleys having a belt thereon, a guide bar spaced from one pulley and substantially engaging the other pulley, and means for driving at least one of said pulleys for advancing the belt and folding the material at the open end of the pockets against the back strip in a direction normal to the back strip.

2. In a device for closing the tops of pockets filled with a material and extending outwardly from the face of a continuous back strip, a pair of pulleys having a belt thereon, a guide bar spaced from one pulley and substantially engaging the other pulley, means for driving at least one of said pulleys for advancing the belt and folding the material at the open end of the pockets against the back strip in a direction normal to the back strip, and means for advancing the strip along said bar at a speed substantially equal to that of the advancing belt.

3. In a device for closing the tops of pockets filled with a material and extending outwardly from the face of a continuous back strip, a pair of pulleys having a belt thereon, a guide bar spaced from one pulley and substantially engaging the other pulley, means for driving at least one of said pulleys for advancing the belt and folding the material at the open end of the pockets against the back strip in a direction normal to the back strip, means for advancing the strip along said bar at a speed substantially equal to that of the advancing belt, and an overrunning clutch between the driving means and the driven pulley which permits the belt to overrun the driving means when its speed is less than that of the strip.

4. In a device for folding the open ends of filled pockets on the face of a continuous strip, a bar along which the strip is advanced, a pair of pulleys, a belt on said pulleys one end being spaced from the bar and the opposite end being substantially in engagement therewith, and means for driving one of said pulleys.

5. In a device for folding the open ends of filled pockets on the face of a continuous strip, a bar along which the strip is advanced, a pair of pulleys, a belt on said pulleys one end being spaced from the bar and the opposite end being substantially in engagement therewith, means for driving one of said pulleys, and a spring pressed plate on said bar moving the bar outwardly into engagement with the belt to produce a predetermined pressure on the material of the folded open ends of the pockets after the material was progressively advanced toward the strip in a direction substantially normal thereto to produce neat folds.

6. In a device for folding the open ends of filled pockets on the face of a continuous strip, a bar along which the strip is advanced, a pair of pulleys, a belt on said pulleys one end being spaced from the bar and the opposite end being substantially in engagement therewith, means for driving one of said pulleys, a spring pressed plate on said bar moving the bar outwardly into engagement with the belt to produce a predetermined pressure on the material of the folded open ends of the pockets after the material was progressively advanced toward the strip in a direction substantially normal thereto to produce neat folds, and means for advancing the strip and pockets along said bar.

7. In a device for folding the open ends of filled pockets on the face of a continuous strip, a bar along which the strip is advanced, a pair of pulleys, a belt on said pulleys one end being spaced from the bar and the opposite end being substantially in engagement therewith, means for driving one of said pulleys, a spring pressed plate on said bar moving the bar outwardly into engagement with the belt to produce a predetermined pressure on the material of the folded open ends of the pockets after the material was progressively advanced toward the strip in a direction substantially normal thereto to produce neat folds, means for advancing the strip and pockets along said bar, and an overrunning clutch between the pulley driven means and the driven belt which permits the overrunning of the belt should the strip be advanced at a rate faster than the rate that the belt is driven.

8. In a device for closing the tops of pockets filled with a material and extending outwardly from the face of a continuous back strip, a pair of pulleys having a belt thereon, a guide bar spaced from one pulley and substantially engaging the other pulley, means for driving at least one of said pulleys for advancing the belt and folding the material at the open end of the pockets against the back strip in a direction normal to the back strip, means for advancing the strip along said bar at a speed substantially equal to that of the advancing belt, and a pair of heating irons having aligned sealing flanges through which the folded ends of the pockets and strip are advanced to produce the heat sealing thereof.

9. In a device for closing the tops of pockets filled with a material and extending outwardly from the face of a continuous back strip, a pair of pulleys having a belt thereon, a guide bar spaced from one pulley and substantially engaging the other pulley, means for driving at least one of said pulleys for advancing the belt and folding the material at the open end of the pockets against the back strip in a direction normal to the back strip, means for advancing the strip along said bar at a speed substantially equal to that of the advancing belt, and a pair of heating irons having aligned sealing flanges through which the folded ends of the pockets and strip are advanced to produce the heat sealing thereof, said advancing means comprising a driven roller and a spring pressed roller engaging the strip along the sealed edge thereof.

10. In a device for closing the tops of pockets filled with a material and extending outwardly from the face of a continuous back strip, a pair of pulleys having a belt thereon, a guide bar spaced from one pulley and substantially engaging the other pulley, means for driving at least one of said pulleys for advancing the belt and folding the material at the open end of the pockets against the back strip in a direction normal to the back strip, means for advancing the strip along said bar at a speed substantially equal to that of the advancing belt, and a pair of heating irons having aligned sealing flanges through which the folded ends of the pockets and strip are advanced to produce the heat sealing thereof, said advancing means comprising a driven roller and a spring pressed roller engaging the strip along the sealed edge thereof, at least one of said rollers having a roughened face which projects into the heat sealed material to improve the seal thereof and its appearance.

11. In a device for closing the tops of pockets filled with a material and extending outwardly from the face of a back strip, a pair of pulleys having a belt thereon, a guide bar spaced from one pulley and substantially engaging the other pulley, means for driving at least one of said pulleys for advancing the belt and folding the material at the open end of the pockets against the back strip in a direction normal to the back strip, means for advancing the strip along said bar at a speed substantially equal to that of the advancing belt, a pair of heating irons having aligned sealing flanges through which the folded ends of the pockets and strip are advanced to produce the heat sealing thereof, one of said irons being movable toward and away from the other, and spring means urging said movable irons toward the other iron with a predetermined pressure.

12. In a device for closing the tops of pockets filled with a material and extending outwardly from the face of a back strip, a pair of pulleys having a belt thereon, a guide bar spaced from one pulley and substantially engaging the other pulley, means for driving at least one of said pulleys for advancing the belt and folding the material at the open end of the pockets against the back strip in a direction normal to the back strip, means for advancing the strip along said bar at a speed substantially equal to that of the advancing belt, a pair of heating irons having aligned sealing flanges through which the folded ends of the pockets and strip are advanced to produce the heat sealing thereof, one of said irons being movable toward and away from the other, spring means urging said movable irons toward the other iron with a predetermined pressure, and means for moving said movable iron away from the other iron while stretching the spring which locks the moving means at the end of its movement and retains the moved iron in retracted position.

13. In a machine having multiple rows of devices for operating on a plurality of continuous strips for closing and sealing the ends of filled packages thereon, each device embodying a bar having guide means for the strip thereon, a belt on a pair of pulleys one of which is driven with one rim of the belt disposed at an angle to the adjacent face of the bar, a pair of sealing irons aligned with the face of the bar engaged by the belt, and a pair of rollers at the end of the sealing irons opposite to that adjacent to the bar, one roller being driven the other being spring pressed theretoward for advancing the strip along the bar and folding the open ends of the pockets against the strip in a direction normal to the strip and through the irons for heat sealing the folded ends as the strip is advanced.

14. In a machine having multiple rows of devices for operating on a plurality of continuous strips for closing and sealing the ends of filled packages thereon, each device embodying a bar having guide means for the strip thereon, a belt on a pair of pulleys one of which is driven with one rim of the belt disposed at an angle to the adjacent face of the bar, a pair of sealing irons aligned with the face of the bar engaged by the belt, and a pair of rollers at the end of the sealing irons opposite to that adjacent to the bar, one roller being driven the other being spring pressed theretoward for advancing the strip along the bar and folding the open ends of the pockets against the strip in a direction normal to the strip and through the irons for heat sealing the folded ends as the strip is advanced at least one of said rollers having a corrugated surface for corrugating the surface of the heat sealed edge to increase the strength thereof and enhance its appearance.

15. In a device for heat sealing the folded ends of filled pockets supported on the face of a continuous strip, an elongated fixed heated sealing iron, an elongated movable heated sealing iron, and spring means for urging the movable heat sealing iron against the fixed heat sealing iron with a predetermined pressure.

16. In a device for heat sealing the folded ends of filled pockets supported on the face of a continuous strip, an elongated fixed heated sealing iron, an elongated movable heated sealing iron, spring means for urging the movable heat sealing iron against the fixed heat sealing iron with a predetermined pressure, a driven roller at the end of the irons from which the strip is drawn, and a spring pressed roller urging the strip against the driven roller which engages the strip along the line at which the heat sealing occurred.

17. In a device for heat sealing the folded ends of filled pockets supported on the face of a continuous strip, an elongated fixed heated sealing iron, an elongated movable heated sealing iron, spring means for urging the movable heat sealing iron against the fixed heat sealing iron with a predetermined pressure, a driven roller at the end of the irons from which the strip is drawn, and a spring pressed roller urging the strip against the driven roller which engages the strip along the line at which the heat sealing occurred, at least one of said rollers having a corrugated face which reforms the material along the line at which the heat sealing occurred for strengthening the seal and enhancing the appearance of ends of the closed pockets.

18. In a device for heat sealing the folded ends of filled pockets supported on the face of a strip, a fixed heat sealing iron, a movable heat sealing iron, and spring means for urging the movable heat sealing iron against the fixed heat sealing iron with a predetermined pressure, said movable heat sealing iron being mounted at the ends of pins eccentrically mounted on spaced bars, a spring engaging one end of each of the bars, links connected to the opposite ends of the bars, and a third bar located between said first bars engaged by the opposite ends of the links, and a handle on said third bar which when rotated stretch the spring and moves the movable iron away from the fixed iron until the ends of the rods on the third bar engage each other to lock the bar in its furthest retracted position.

References Cited

UNITED STATES PATENTS

| 2,218,585 | 10/1940 | Merkle | 53—373 X |
| 2,253,036 | 8/1941 | Kimple et al. | 53—373 |
| 2,356,472 | 8/1944 | Rothaug | 53—39 X |
| 2,376,360 | 5/1945 | Irmscher | 53—373 X |
| 2,556,008 | 6/1951 | Spalding. | |
| 2,671,587 | 3/1954 | Vogt | 53—373 X |
| 2,697,473 | 12/1954 | Techtmann | 53—373 X |
| 2,826,020 | 3/1958 | Hoag | 53—28 |

TRAVIS S. McGEHEE, *Primary Examiner.*